(12) United States Patent
Chu et al.

(10) Patent No.: US 7,212,702 B1
(45) Date of Patent: May 1, 2007

(54) OPTOELECTRIC CONVERTING SUBSTRATE

(75) Inventors: Yen Chu, Hsinchu Hsien (TW); Ying-Chih Chen, Hsinchu (TW); Shun-Tien Lee, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/488,113

(22) Filed: Jul. 18, 2006

(30) Foreign Application Priority Data

Oct. 24, 2005 (TW) .............................. 94137083 A

(51) Int. Cl.
*G02B 6/02* (2006.01)
*G02B 6/12* (2006.01)
*G02B 6/32* (2006.01)
*G02B 6/36* (2006.01)

(52) U.S. Cl. ........................ 385/14; 385/125; 385/126
(58) Field of Classification Search ................ 385/14, 385/123, 125, 126
See application file for complete search history.

(56) References Cited

U.S. PATENT DOCUMENTS

| | | | | |
|---|---|---|---|---|
| 3,663,194 A | * | 5/1972 | Greenstein et al. ............ 65/43 |
| 5,446,814 A | * | 8/1995 | Kuo et al. ..................... 385/31 |
| 6,330,377 B1 | * | 12/2001 | Kosemura ..................... 385/14 |
| 6,389,202 B1 | * | 5/2002 | Delpiano et al. .............. 385/49 |
| 6,603,915 B2 | * | 8/2003 | Glebov et al. ............... 385/129 |
| 6,690,857 B2 | * | 2/2004 | Zhao et al. .................... 385/30 |
| 6,907,173 B2 | * | 6/2005 | Hiramatsu .................. 385/126 |
| 7,125,176 B1 | * | 10/2006 | Stafford et al. ............... 385/94 |

* cited by examiner

*Primary Examiner*—Sung Pak
*Assistant Examiner*—Daniel Petkovsek
(74) *Attorney, Agent, or Firm*—Birch, Stewart, Kolasch & Birch, LLP

(57) ABSTRACT

An optoelectric converting substrate includes a substrate, at least one honeycomb-shaped micro-structured optical waveguide embedded in the substrate and having two ends exposed through the substrate, a plurality of optoelectronic elements disposed on the substrate and coupled with the two ends of the honeycomb-shaped micro-structured optical waveguide, and a plurality of IC driving elements disposed on the substrate and electrically connected with the optoelectronic elements by conductive wires to drive the optoelectronic elements such that optical signals are transmitted through the honeycomb-shaped micro-structured optical waveguide. The optoelectric converting substrate can be easily fabricated at a low cost and effectively increases the displacement tolerance of the optoelectronic elements in substrate packaging.

13 Claims, 5 Drawing Sheets

OPTOELECTRIC CONVERTING SUBSTRATE

BACKGROUND OF THE INVENTION

1. Field of the Invention

The present invention relates to an optoelectric converting substrate, and more particularly, to an optoelectric converting substrate having a honeycomb-shaped micro-structured optical waveguide.

2. Description of Related Art

With the development of optical communication technology and optical networking, optical interconnection technology has attracted more and more attention. Compared with the electrical interconnection, transmission over optical lines is much faster. The optical interconnection can be applied to device-to-device links (video to PC) and within computers (e.g. CPU to memory or CPU to CPU connections) for high speed signal transmission. As a result, optoelectric converting substrates have been developed which can enable fast communication between ICs of a multiple chip module (MCM), for example.

Referring to FIG. 6, a sectional view of an optoelectric converting substrate 3 according to U.S. Pat. No. 6,603,915 is shown. An optical waveguide 32 is formed inside a silicon substrate 31 for signal transmission between optoelectronic elements 33 located on the silicon substrate 31. However, to form such a structure, the silicon substrate 31 needs to be etched first, and then a cladding layer 321 and a core layer 322 are sequentially grown on the substrate 31, thereby resulting in a complicated fabrication process. In addition, such technique is incompatible with current fabrication process of the printed circuit boards currently in wide use.

Referring to FIG. 7, a sectional view of an optoelectric converting substrate 4 according to U.S. Pat. No. 6,389,202 is shown. Optical radiation 40 is passed through an optical waveguide 41 and then reflected to an optoelectronic element 43 by a reflecting board inclined at 45 degree relative to the optical waveguide 41. However, such a reflecting board inclined at 45 degree is hard to be fabricated and it is also difficult to optically couple the optical radiation 40 with the optoelectronic element 43. Thus, such a structure is incompatible with current fabrication process of the printed circuit boards as far as optical alignment precision is concerned. In addition, the optoelectronic element 43 in such a structure has limited displacement tolerance in packaging the optoelectric converting substrate 4.

Accordingly, a honeycomb-shaped micro-structured optical waveguide 5 (referring to FIG. 8) can be applied to printed circuit boards to overcome the drawback of the prior art. Although such a structure has been applied in image transmission (referring to Martijn A. Van Eijkelenborg, "Imaging with microstructured polymer fibre", 2004), it has not yet been applied to the field of printed circuit boards (or substrates).

Referring to FIG. 8, the honeycomb-shaped micro-structured optical waveguide 5 comprises a high-refraction cylinder 51 and a plurality of holes 52. The high-refraction cylinder 51 is made of high temperature resistant plastics and thereby meets the requirements for printed circuit board fabrication. The plurality of holes 52 are honeycomb-shaped and configured to contain air. The refractive index of the high-refraction cylinder 51 is approximately 1.5, and that of air is approximately 1, thus the absolute value of the difference between the two aforesaid refractive indexes is 0.5. The higher the absolute value is, the less is the attenuation of optical transmission in the honeycomb-shaped micro-structured optical waveguide 5. In addition, the smaller the bendable angular radius of the honeycomb-shaped micro-structured optical waveguide 5 is, the easier it is to bend the honeycomb-shaped micro-structured optical waveguide 5. Therefore, the honeycomb-shaped micro-structured optical waveguide 5 can be applied to the optoelectric converting printed circuit boards for optical signal transmission. It should be noted that light is transmitted through the high-refraction cylinder 51 instead of the plurality of holes 52.

SUMMARY OF THE INVENTION

According to the above defects, a primary objective of the present invention is to provide an optoelectric converting substrate which increases the displacement tolerance of optoelectronic elements in substrate packaging.

Another objective of the present invention is to provide an optoelectric converting substrate which assumes a three-dimensional multiple channel structure.

A further objective of the present invention is to provide an optoelectric converting substrate which solves the drawback of incompatibility of fabricating processes between conventional optoelectric converting substrates and printed circuit boards.

Still another objective of the present invention is to provide an optoelectric converting substrate, the honeycomb-shaped micro-structured optical waveguide of which has a high refractive index and high flexibility and accordingly smaller bending curvature.

Still another objective of the present invention is to provide an optoelectric converting substrate which allows more channel transmission in a unit area and accordingly allows the pitch between VCSEL (vertical-cavity surface-emitting lasers) elements to be less than 250 mm; in other words, a VCSEL substrate can accommodate more VCSEL elements per unit area.

Still another objective of the substrate is to provide an optoelectric converting substrate which provides asymmetrical structure on the ends of the honeycomb-shaped micro-structured optical waveguide to facilitate alignment during layout and act as a fool-proof device to avoid dislocation in an one-to-one relationship between a Tx channel and a Rx channel in a M×N array.

To achieve the above and other objectives, the present invention proposes an optoelectric converting substrate comprising a substrate, at least one honeycomb-shaped micro-structured optical waveguide embedded in the substrate and having two ends exposed through the substrate, a plurality of optoelectronic elements disposed on the substrate and coupled with the two ends of the honeycomb-shaped micro-structured optical waveguide, and a plurality of IC driving elements disposed on the substrate and electrically connected with the optoelectronic elements by conductive wires such that the IC driving elements drive the optoelectronic elements with a view to transmitting optical signals through the honeycomb-shaped micro-structured optical waveguide.

Therein, the substrate has a plurality of holes which allow the honeycomb-shaped micro-structured optical waveguide to pass through.

The honeycomb-shaped micro-structured optical waveguide comprises a high-refraction cylinder and a plurality of holes, wherein the high-refraction cylinder is made of one selected from the group consisting of plastic fiber or glass fiber and each of the holes could have a cellular shape or a circular shape. With the high-refraction cylinder having a high refractive index and high flexibility, the honeycomb-shaped micro-structured optical waveguide has small bending curvature.

Each of the two ends of the honeycomb-shaped micro-structured optical waveguide is provided with at least one alignment structure or at least one alignment mark which is aligned and optically coupled with the optoelectronic elements in order to increase the displacement tolerance of the optoelectronic elements in substrate packaging and to increase the number of array channels.

The optoelectronic elements can be directly and optically coupled with the two ends of the honeycomb-shaped micro-structured optical waveguide for signal transmission. In addition, the honeycomb-shaped micro-structured optical waveguide can be aligned and optically coupled with the optoelectronic elements according to waveguide asymmetry. Therein, the optoelectronic elements are active elements, and the IC driving elements are passive elements.

The optoelectric converting substrate of the present invention can comprise a plurality of honeycomb-shaped micro-structured optical waveguides embedded therein and having two ends exposed through the substrate. The plurality of honeycomb-shaped micro-structured optical waveguides can span each other to assume a three-dimensional multiple channel structure and thereby increase channel transmission per unit area.

In addition, a plurality of optic subassemblies integrating optoelectronic elements and IC driving elements can be applied to the optoelectric converting substrate of the present invention.

Accordingly, the optoelectric substrate of the present invention can be fabricated easily at a low fabrication cost. In addition, the optoelectric substrate overcomes the drawback of incompatibility of fabricating processes between conventional optoelectric substrates and printed circuit boards in the prior art. Furthermore, the displacement tolerance of optoelectronic elements in substrate packaging can be effectively increased.

DETAILED DESCRIPTION OF PREFERRED EMBODIMENTS

Hereunder, embodiments of the present invention will be described in full detail with reference to the accompanying drawings.

Figure 1:
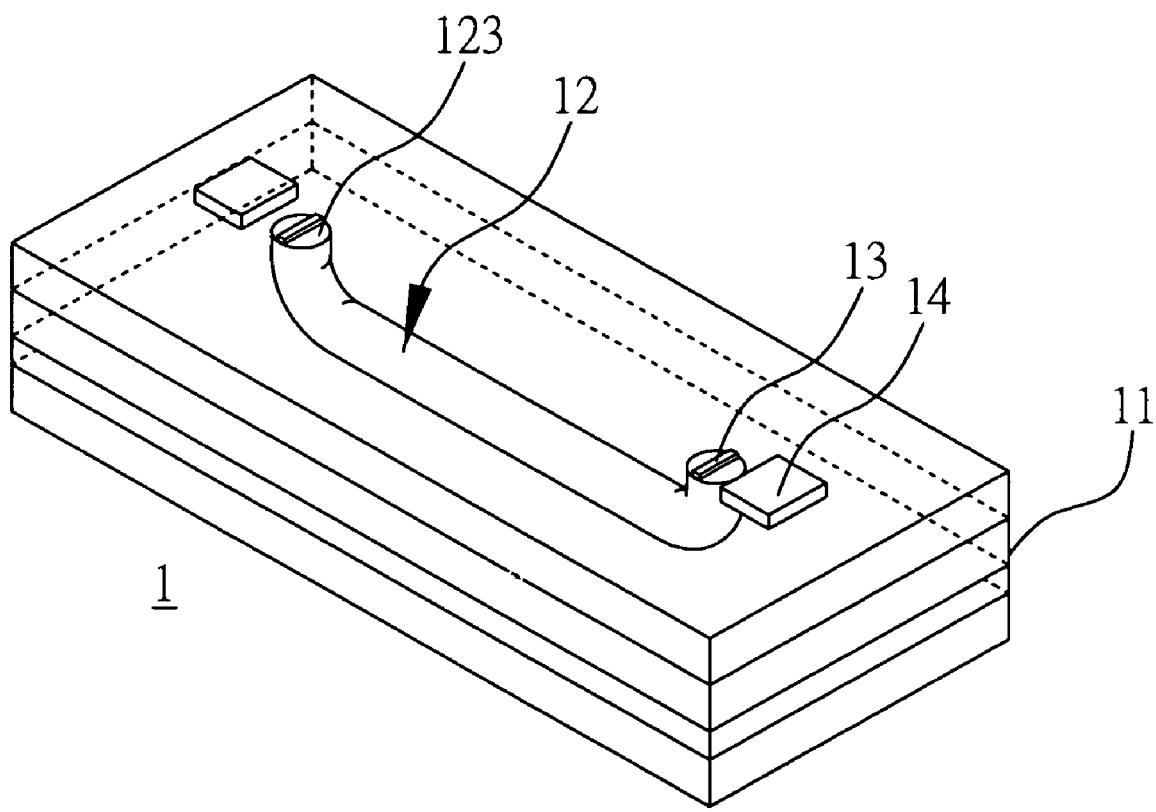
FIG. 1 is a diagram of an optoelectric converting substrate of the present invention.

Referring to FIG. 1, an optoelectric converting substrate 1 according to a first embodiment of the present invention comprises a substrate 11, at least one honeycomb-shaped micro-structured optical waveguide 12 embedded in the substrate 11 and having two ends 123 exposed through the substrate 11, a plurality of optoelectronic elements 13 disposed on the substrate 11 and coupled with the two ends 123 of the honeycomb-shaped micro-structured optical waveguide 12; and a plurality of IC driving elements 14 disposed on the substrate 11 and electrically connected with the optoelectronic elements 13 by conductive wires such that the IC driving elements 14 drive the optoelectronic elements 13 with a view to transmitting optical signals through the honeycomb-shaped micro-structured optical waveguide 12.

When preparing a substrate 11 having multiple layers, before depositing the multiple layers, a plurality of holes can be formed first such that the honeycomb-shaped micro-structured optical waveguide 12 can be passed through the holes (not shown). Compared with the conventional technique which first etches a silicon substrate and then embeds an optical waveguide in the substrate, the present fabrication process is much simpler and therefore reduces the fabricating cost.

Figure 2:
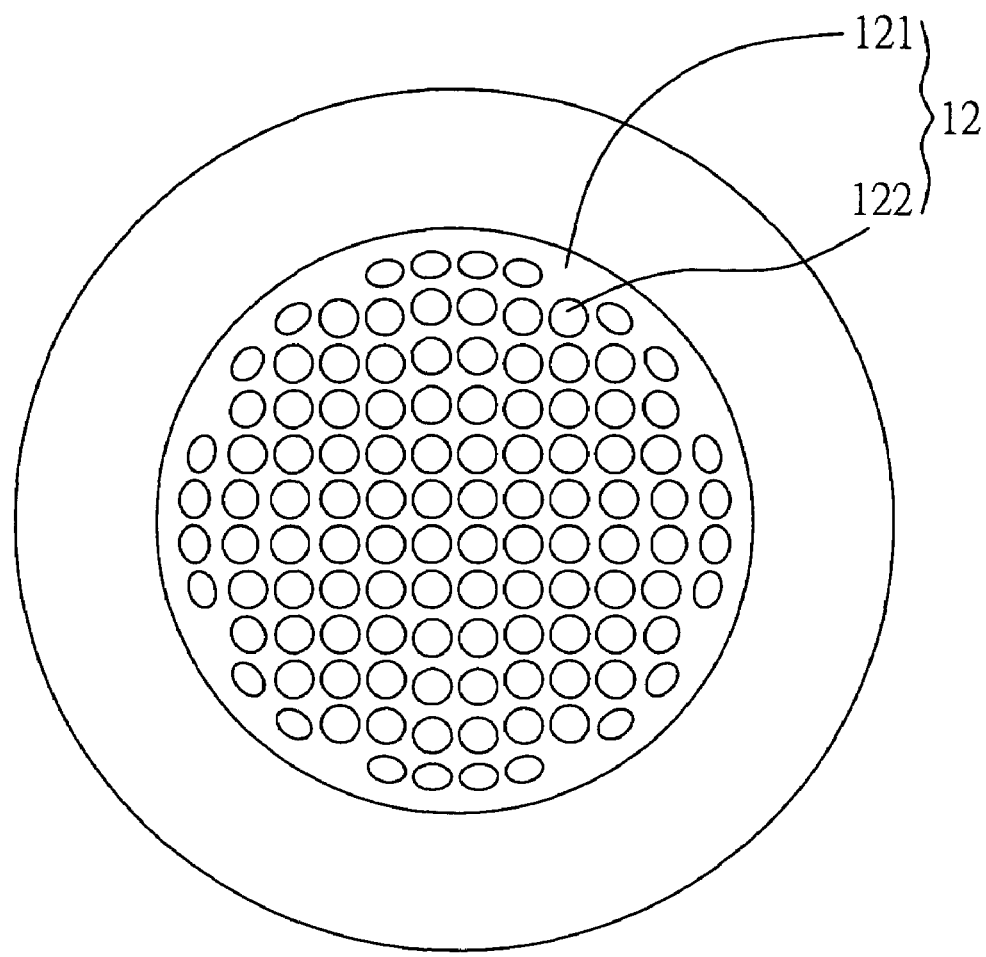
FIG. 2 is a sectional view of a honeycomb-shaped micro-structured optical waveguide according to the present invention.

Referring to FIG. 2, the honeycomb-shaped micro-structured optical waveguide 12 comprises a high-refraction cylinder 121 and a plurality of holes 122, which overcomes the drawback of incompatibility of fabrication processes between conventional optoelectric converting substrates and printed circuit boards. Therein, the high-refraction cylinder 121 is made of one selected from the group consisting of plastic fiber and glass fiber. Each of the holes 122 could have a cellular shape or a circular shape. Since the high-refraction cylinder 121 has a high refractive index and high flexibility, the honeycomb-shaped micro-structured optical waveguide 12 has small bending curvature.

Figure 3:
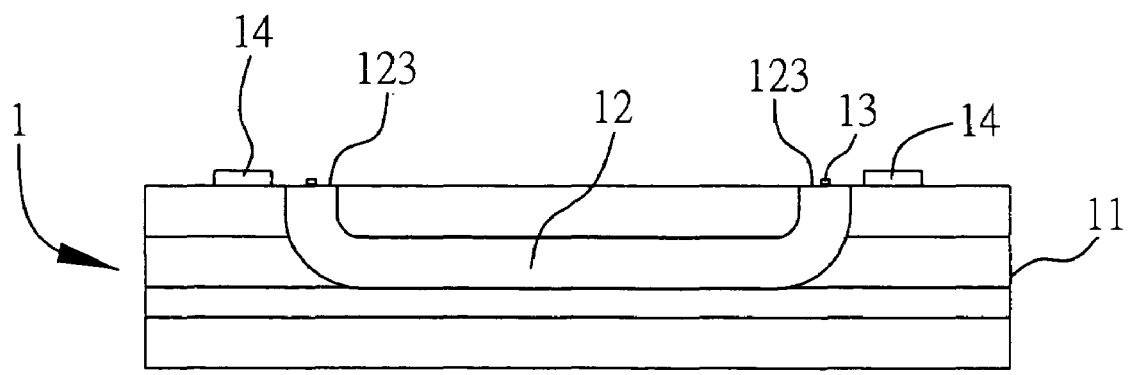
FIG. 3 is a sectional view of an optoelectric converting substrate according to a first embodiment of the present invention.

Referring to FIG. 3, each of the two ends 123 of the honeycomb-shaped micro-structured optical waveguide 12 is provided with at least one alignment structure or at least one alignment mark (not shown) which is aligned and optically coupled with the optoelectronic elements 13 to increase the displacement tolerance of the optoelectronic elements 13 in substrate packaging and to increase the number of array channels. In addition, the ends 123 can be provided with asymmetrical structure to facilitate alignment during the layout. For a M×N array structure, to avoid the twisting of the honeycomb-shaped micro-structured optical waveguide structure during the layout which can lead to dislocation in an one-to-one relationship between a Tx Channel and a Rx channel, asymmetrical structure is applied to the honeycomb-shaped micro-structured optical waveguide 12 which functions as a fool-proof device.

The optoelectronic elements 13 are directly optically coupled with the two ends 123 of the honeycomb-shaped micro-structured optical waveguide 12 such that optical signals are transmitted between the optoelectronic elements 13 through the honeycomb-shaped micro-structured optical waveguide 12. In addition, the honeycomb-shaped micro-structured optical waveguide 12 can be aligned and optically coupled with the optoelectronic elements 13 according to waveguide asymmetry. The optoelectronic elements 13 act as active elements, whereas the IC driving elements 14 act as passive elements.

Figure 4:
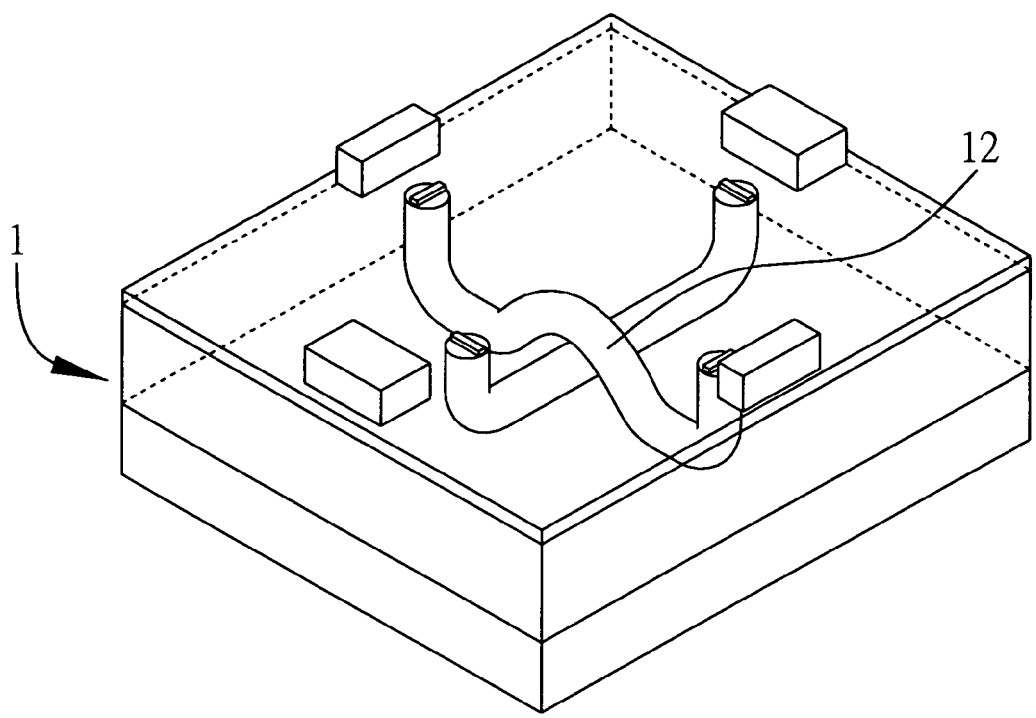
FIG. 4 is a diagram of an optoelectric converting substrate according to a second embodiment of the present invention.

FIG. 4 shows an optoelectric converting substrate 1 according to a second embodiment of the present invention. The difference between FIG. 4 and FIG. 1 is that the substrate in FIG. 4 comprises a plurality of honeycomb-shaped micro-structured optical waveguide 12 which span each other. As a result, a three-dimensional multiple channel structure is implemented, enhancing channel transmission per unit area. Therefore, the pitch between the VCSEL (vertical-cavity surface-emitting lasers) elements can be less than 250 mm. In other words, a VCSEL wafer can be disposed with more VCSEL elements per unit area.

Figure 5:
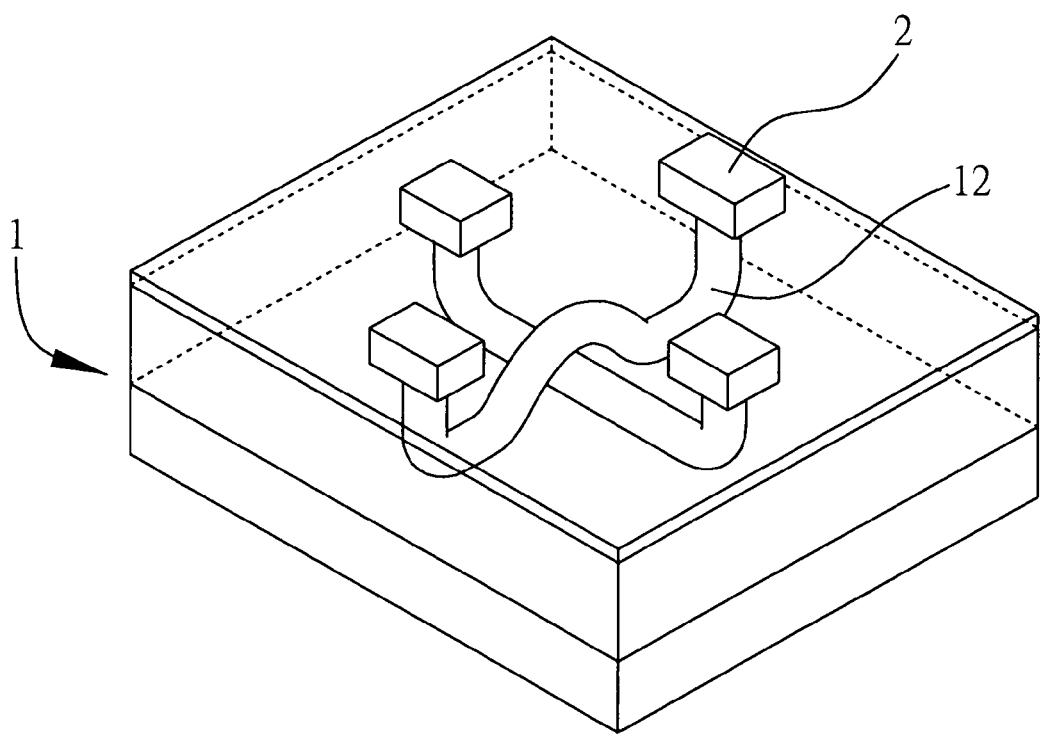
FIG. 5 is a diagram of an optoelectric converting substrate according to a third embodiment of the present invention.
Figure 6:
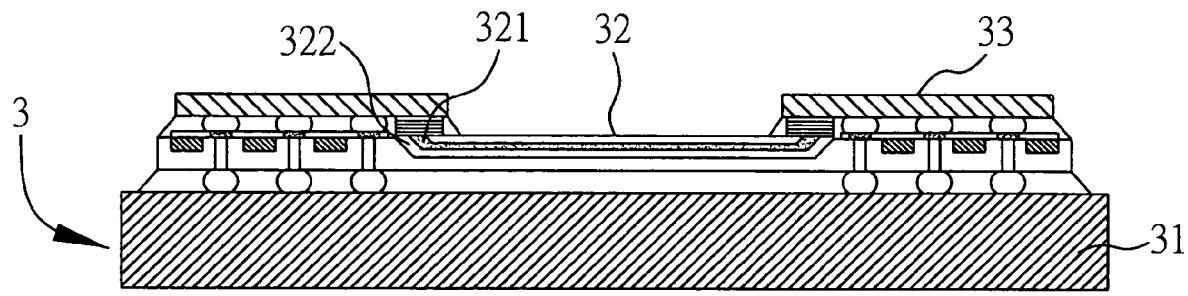
FIG. 6 is a sectional view of an optoelectric converting substrate disclosed by U.S. Pat. No. 6,603,915.
Figure 7:
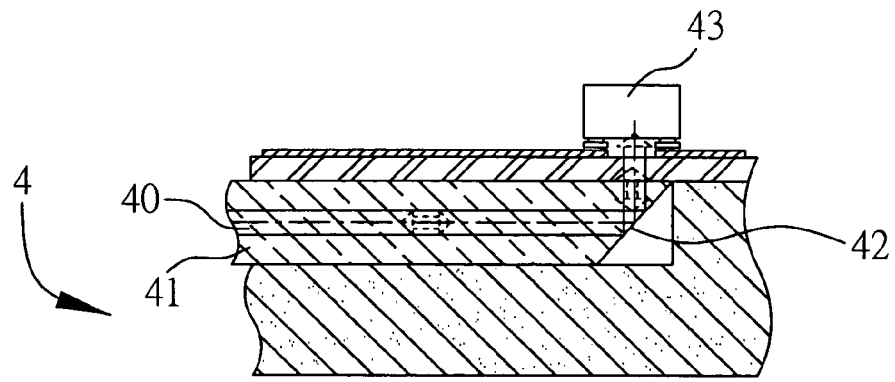
FIG. 7 is a sectional view of an optoelectric converting substrate disclosed by U.S. Pat. No. 6,389,202.
Figure 8:
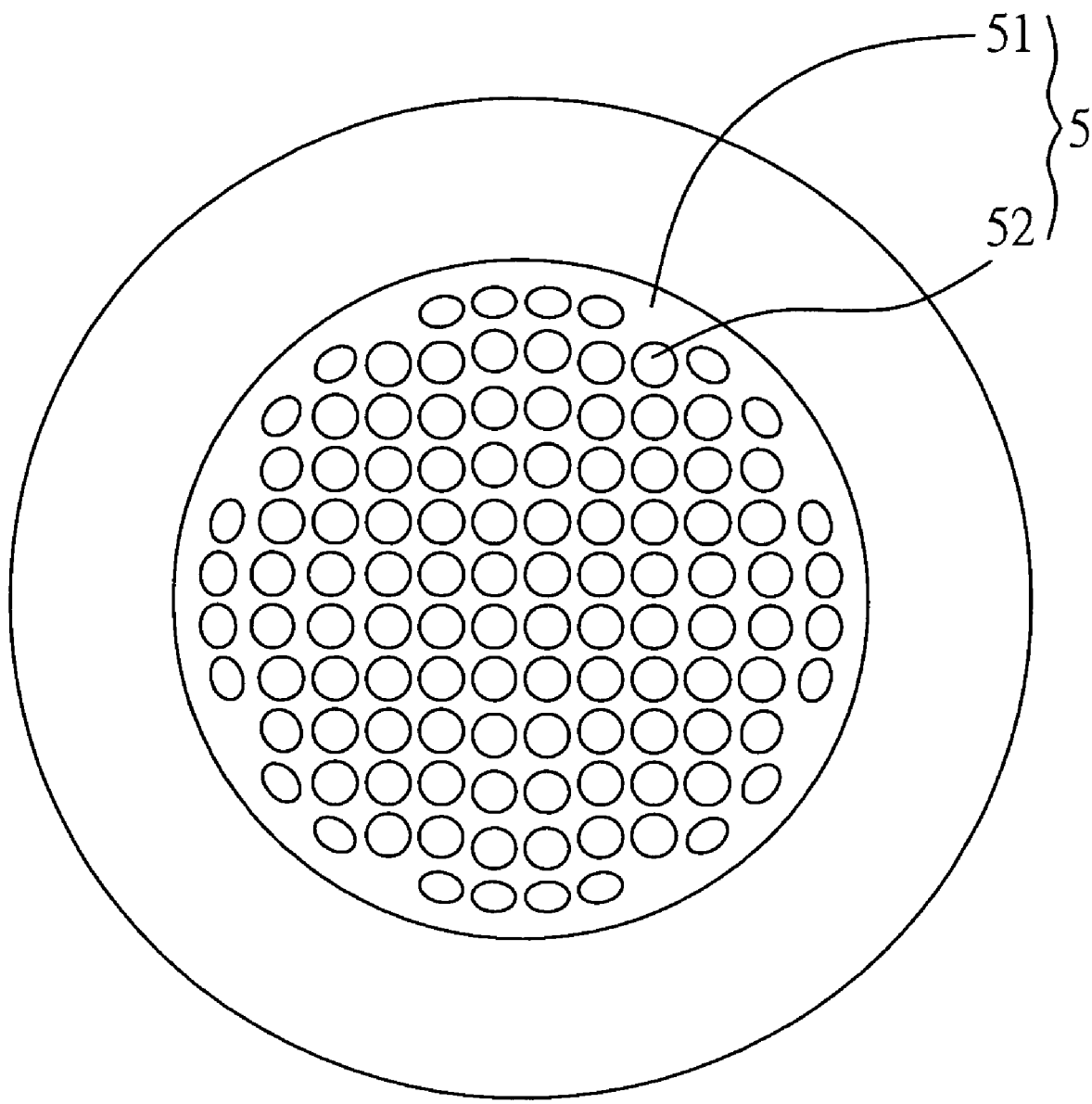
FIG. 8 is a sectional view of a prior-art honeycomb-shaped micro-structured optical waveguide.

FIG. 5 shows an optoelectric converting substrate 1 according to a third embodiment of the present invention. The difference between FIG. 5 and FIG. 4 is that substrate 1 comprises a plurality of optical subassembly 2 integrating optoelectronic elements and IC driving elements.

Thus, the optoelectric substrate 1 of the present invention can be easily fabricated at a lower fabrication cost. In addition, the optoelectric substrate 1 overcomes the drawback of incompatibility of fabricating processes between conventional optoelectric substrates and printed circuit boards. Furthermore, the displacement tolerance of the optoelectronic elements in substrate packaging can be effectively increased.

The present invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An optoelectric converting substrate, comprising:
   a substrate;
   at least one honeycomb-shaped micro-structured optical waveguide embedded in the substrate and having two ends exposed through the substrate;
   a plurality of optoelectronic elements disposed on the substrate and coupled with the two ends of the honeycomb-shaped micro-structured optical waveguide; and
   a plurality of IC driving elements disposed on the substrate and electrically connected with the optoelectronic elements by conductive wires such that the IC driving elements drive the optoelectronic elements with a view to transmitting optical signals through the honeycomb-shaped micro-structured optical waveguide.

2. The optoelectric converting substrate of claim 1, wherein the substrate is formed with a plurality of holes through which the honeycomb-shaped micro-structured optical waveguide passes.

3. The optoelectric converting substrate of claim 1, wherein the honeycomb-shaped micro-structured optical waveguide comprises a high-refraction cylinder and a plurality of holes.

4. The optoelectric converting substrate of claim 3, wherein the high-refraction cylinder is made of one selected from the group consisting of plastic fiber and glass fiber.

5. The optoelectric converting substrate of claim 3, wherein each of the holes is in a shape selected from the group consisting of a cellular shape and a circular shape.

6. The optoelectric converting substrate of claim 1, wherein each of the two ends of the honeycomb-shaped micro-structured optical waveguide is provided with at least one alignment structure or at least one alignment mark.

7. The optoelectric converting substrate of claim 6, wherein the alignment structure or the alignment mark is aligned and optically coupled with the optoelectronic elements.

8. The optoelectric converting substrate of claim 1, wherein the optoelectronic elements are directly and optically coupled with the two ends of the honeycomb-shaped micro-structured optical waveguide such that optical signals are transmitted between the optoelectronic elements through the honeycomb-shaped micro-structured optical waveguide.

9. The optoelectric converting substrate of claim 1, wherein the honeycomb-shaped micro-structured optical waveguide can be aligned and optically coupled with the optoelectronic elements according to waveguide asymmetry.

10. The optoelectric converting substrate of claim 1, wherein the optoelectronic elements act as active elements.

11. The optoelectric converting substrate of claim 1, wherein the IC driving elements are act as passive elements.

12. An optoelectric converting substrate, comprising:
    a substrate;
    a plurality of honeycomb-shaped micro-structured optical waveguides embedded in the substrate and having two ends exposed through the substrate;
    a plurality of optoelectronic elements disposed on the substrate and coupled with the two ends of the honeycomb-shaped micro-structured optical waveguides; and
    a plurality of IC driving elements disposed on the substrate and electrically connected with the optoelectronic elements by conductive wires such that the IC driving elements drive the optoelectronic elements with a view to transmitting optical signals through the honeycomb-shaped micro-structured optical waveguides.

13. The optoelectric converting substrate of claim 12, wherein the plurality of honeycomb-shaped micro-structured optical waveguides can span each other.

* * * * *